(12) United States Patent
Shimizu

(10) Patent No.: US 11,518,283 B2
(45) Date of Patent: Dec. 6, 2022

(54) VEHICLE

(71) Applicant: TOYOTA JIDOSHA KABUSHIKI KAISHA, Aichi-ken (JP)

(72) Inventor: Tatsuya Shimizu, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/399,053

(22) Filed: Aug. 11, 2021

(65) Prior Publication Data

US 2022/0118830 A1 Apr. 21, 2022

(30) Foreign Application Priority Data

Oct. 20, 2020 (JP) .............................. JP2020-176304

(51) Int. Cl.
*B60N 2/75* (2018.01)
*B60J 5/04* (2006.01)

(52) U.S. Cl.
CPC .............. *B60N 2/78* (2018.02); *B60J 5/0493* (2013.01); *B60N 2/753* (2018.02)

(58) Field of Classification Search
CPC .......... B60J 5/0493; B60N 2/75; B60N 2/753; B60N 2/777; B60N 2/78
USPC ....................................................... 296/1.09
See application file for complete search history.

(56) References Cited

U.S. PATENT DOCUMENTS

| | | | | |
|---|---|---|---|---|
| 6,145,919 A | * | 11/2000 | Mysliwiec | B60N 2/78 296/153 |
| 7,469,964 B2 | * | 12/2008 | Baumann | B60N 2/757 244/118.6 |
| 7,677,654 B2 | * | 3/2010 | Enberg | B60N 2/77 297/411.32 |
| 10,413,072 B2 | * | 9/2019 | Bock | A47C 1/0308 |
| 2006/0163933 A1 | * | 7/2006 | Radu | B60N 2/767 297/411.35 |
| 2009/0079228 A1 | * | 3/2009 | Sturt | B60N 2/793 296/153 |
| 2010/0045067 A1 | * | 2/2010 | Schulz | B60N 2/4235 296/153 |

FOREIGN PATENT DOCUMENTS

| | | | | |
|---|---|---|---|---|
| DE | 10307481 A1 | * | 9/2004 | ............. B60N 2/78 |
| JP | 2007253673 A | * | 10/2007 | |
| JP | 2016203692 A | | 12/2016 | |
| JP | 202083238 A | | 6/2020 | |
| KR | 200148105 Y1 | * | 6/1999 | ............. B60N 2/753 |

* cited by examiner

*Primary Examiner* — Jason S Morrow
(74) *Attorney, Agent, or Firm* — Hauptman Ham, LLP

(57) ABSTRACT

Provided is a vehicle including: an arm rest placed between a vehicle seat and a side door; and a moving mechanism configured to move the arm rest in the thickness direction of the side door such that the arm rest takes a usage position and a stored position. The usage position is a position at which the arm rest is usable for an occupant sitting on the vehicle seat. The stored position is a position at which the arm rest is stored in a storage portion provided in the side door.

6 Claims, 6 Drawing Sheets

VEHICLE

CROSS-REFERENCE TO RELATED APPLICATION

This application claims priority to Japanese Patent Application No. 2020-176304 filed on Oct. 20, 2020, incorporated herein by reference in its entirety.

BACKGROUND

1. Technical Field

The present disclosure relates to a vehicle.

2. Description of Related Art

The following arm rest device has been known in the related art (e.g., see Japanese Unexamined Patent Application Publication No. 2020-083238 (JP 2020-083238 A)). That is, the arm rest device is configured such that, in self-driving of a vehicle, an arm rest provided on an inner wall of a side door is movable from its initial position in manual driving of the vehicle to an advance position on the front side in the vehicle front-rear direction and on the inner side in the vehicle width direction. The arm rest is movable from the initial position to the advance position by a link mechanism provided inside a base member projecting inwardly in the vehicle width direction from the inner wall of the side door.

SUMMARY

In the meantime, in self-driving of the vehicle, an occupant sitting on a vehicle seat may take a posture other than a posture to face forward in the vehicle front-rear direction. However, the arm rest configured to move from the initial position to the advance position as described above may bother the occupant sitting on the vehicle seat during self-driving, and the arm rest may cause such an inconvenience that a vehicle cabin space around the occupant is narrowed. Thus, there is room for improvement in the viewpoint of increasing the vehicle cabin space in self-driving of the vehicle so as to improve comfortability for the occupant.

In view of this, an object of the present disclosure is to provide a vehicle in which a vehicle cabin space can be increased so as to improve comfortability for an occupant.

In order to achieve the above object, a vehicle according to a first aspect of the present disclosure includes an arm rest and a moving mechanism. The arm rest is placed between a vehicle seat and a side door. The moving mechanism is configured to move the arm rest in a thickness direction of the side door such that the arm rest takes a usage position and a stored position, the usage position being a position at which the arm rest is usable for an occupant sitting on the vehicle seat, the stored position being a position at which the arm rest is stored in a storage portion provided in the side door.

In the disclosure according to the first aspect, due to the moving mechanism configured to move the arm rest in the thickness direction of the side door, the arm rest takes the usage position and the stored position. The usage position is a position at which the arm rest is usable for the occupant sitting on the vehicle seat. The stored position is a position at which the arm rest is stored in the storage portion provided in the side door. Accordingly, when the arm rest is unnecessary, the arm rest is stored in the storage portion, so that a vehicle cabin space can be increased. Hereby, for example, even when the occupant sitting on the vehicle seat changes his or her posture on the vehicle seat in self-driving, it is possible to prevent a knee or the like of the occupant from hitting the arm rest, thereby making it possible to improve comfortability for the occupant.

Further, a vehicle according to a second aspect is configured as follows. That is, the vehicle according to the first aspect may include a travel controlling portion configured to switch between a manual operation mode and a self-driving mode, and a movement controlling portion configured to control the moving mechanism. When the travel controlling portion switches the manual operation mode to the self-driving mode, the movement controlling portion may control the moving mechanism such that the arm rest is moved from the usage position to the stored position.

In the disclosure according to the second aspect, when the travel controlling portion switches the manual operation mode to the self-driving mode, the moving controlling portion controls the moving mechanism such that the arm rest is moved from the usage position to the stored position. Accordingly, even when the occupant sitting on the vehicle seat does not perform any additional operation in self-driving, the arm rest is automatically stored in the storage portion. This further improves comfortability for the occupant.

Further, a vehicle according to a third aspect is configured as follows. That is, the vehicle according to the second aspect may include: door glass provided in the side door such that the door glass is raised and lowered; a detecting portion configured to detect a raised-lowered state of the door glass; and a glass controlling portion configured to control raising and lowering of the door glass. In a case where the detecting portion detects the door glass being lowered to or below a predetermined position when the travel controlling portion switches the manual operation mode to the self-driving mode, the glass controlling portion may raise the door glass to or above the predetermined position.

In the disclosure according to the third aspect, in a case where the detecting portion detects the door glass being lowered to or below the predetermined position when the travel controlling portion switches the manual operation mode to the self-driving mode, the glass controlling portion raises the door glass to or above the predetermined position. Accordingly, even when the occupant sitting on the vehicle seat does not perform any additional operation, it is possible to prevent occurrence of an inconvenience to be caused when the arm rest moving to the stored position hits the door glass.

Further, a vehicle according to a fourth aspect is configured as follows. That is, the vehicle according to the second aspect may include: door glass provided in the side door such that the door glass is raised and lowered; and a detecting portion configured to detect a raised-lowered state of the door glass. In a case where the detecting portion detects the door glass being lowered to or below a predetermined position when the travel controlling portion switches the manual operation mode to the self-driving mode, the movement controlling portion may control the moving mechanism such that the arm rest is not moved from the usage position to the stored position.

In the disclosure according to the fourth aspect, in a case where the detecting portion detects the door glass being lowered to or below the predetermined position when the travel controlling portion switches the manual operation mode to the self-driving mode, the moving controlling portion controls the moving mechanism such that the movement of the arm rest from the usage position to the stored position is prohibited. Accordingly, even when the occupant sitting on the vehicle seat does not perform any additional operation, it is possible to prevent occurrence of an inconvenience to be caused when the arm rest moving to the stored position hits the door glass.

Further, a vehicle according to a fifth aspect is configured as follows. That is, the vehicle according to the fourth aspect may include a notification unit configured to notify the occupant that the movement controlling portion controls the moving mechanism such that the arm rest is not moved from the usage position to the stored position.

In the disclosure according to the fifth aspect, the notification unit notifies the occupant that the movement of the arm rest from the usage position to the stored position is prohibited. Hereby, the occupant can recognize the reason why the arm rest cannot be stored, so that the occupant can take appropriate measures necessary to store the arm rest.

Further, a vehicle according to a sixth aspect is configured as follows. That is, the vehicle according to any one of the third to fifth aspects may include an air-conditioning controlling portion configured to control a vehicle air-conditioning device. In a case where the detecting portion detects the door glass being raised to an upper limit of the door glass when the movement controlling portion controls the moving mechanism such that the arm rest is moved to the stored position, the air-conditioning controlling portion may switch the vehicle air-conditioning device to an external-air introduction mode.

In the disclosure according to the sixth aspect, in a case where the detecting portion detects the door glass being raised to its upper limit when the movement controlling portion controls the moving mechanism such that the arm rest is moved to the stored position, the air-conditioning controlling portion switches the vehicle air-conditioning device to the external-air introduction mode. Accordingly, in self-driving, it is possible to automatically restrain poor ventilation inside the vehicle cabin, thereby making it possible to improve comfortability for the occupant.

Further, a vehicle according to a seventh aspect is configured as follows. That is, the vehicle according to any one of the third to sixth aspects may include a subsidiary glass controlling portion configured to control raising and lowering of door glass of a side door including an immovable arm rest. In a case where the detecting portion detects the door glass being raised to an upper limit of the door glass when the movement controlling portion controls the moving mechanism such that the arm rest is moved to the stored position, the subsidiary glass controlling portion may lower the door glass of the side door including the immovable arm rest.

In the disclosure according to the seventh aspect, in a case where the detecting portion detects the door glass being raised to its upper limit when the movement controlling portion controls the moving mechanism such that the arm rest is moved to the stored position, the subsidiary glass controlling portion lowers the door glass of the side door including the immovable arm rest. Accordingly, in self-driving, it is possible to automatically restrain poor ventilation inside the vehicle cabin, thereby making it possible to improve comfortability for the occupant.

As described above, with the present disclosure, it is possible to increase the vehicle cabin space and to improve comfortability for the occupant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes an embodiment of the present disclosure in detail with reference to the drawings. Note that an arm rest 30 (see FIG. 2) according to the present embodiment is suitable mainly for a vehicle 10 (see FIG. 1) operable by self-driving. Accordingly, the following deals with the vehicle 10 operable by self-driving.

Further, for purposes of this description, an arrow UP illustrated appropriately in each drawing indicates an upper direction of the vehicle 10, an arrow FR indicates a front direction of the vehicle 10, and an arrow RH indicates a right direction of the vehicle 10. Accordingly, in the following description, in a case where upper and lower sides, front and rear sides, and right and left sides are described without any special description, they respectively indicate the upper and lower sides in the up-down direction of the vehicle 10, the front and rear sides in the front-rear direction of the vehicle 10, and the right and left sides in the right-left direction of the vehicle 10.

Figure 3:
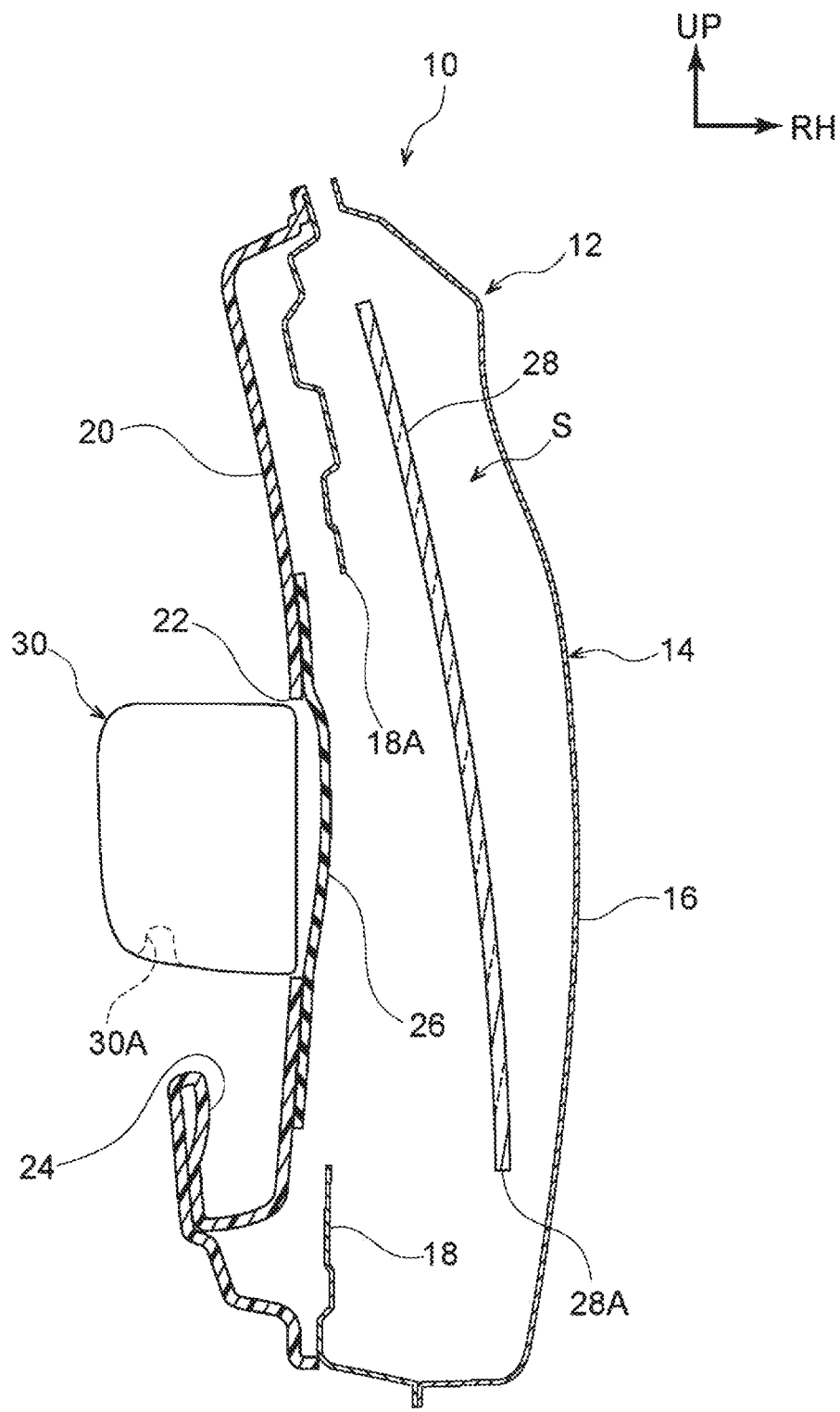
FIG. 3 is a sectional view taken along an arrow X-X in FIG. 2 when the arm rest according to the present embodiment is placed at a usage position.
Figure 4:
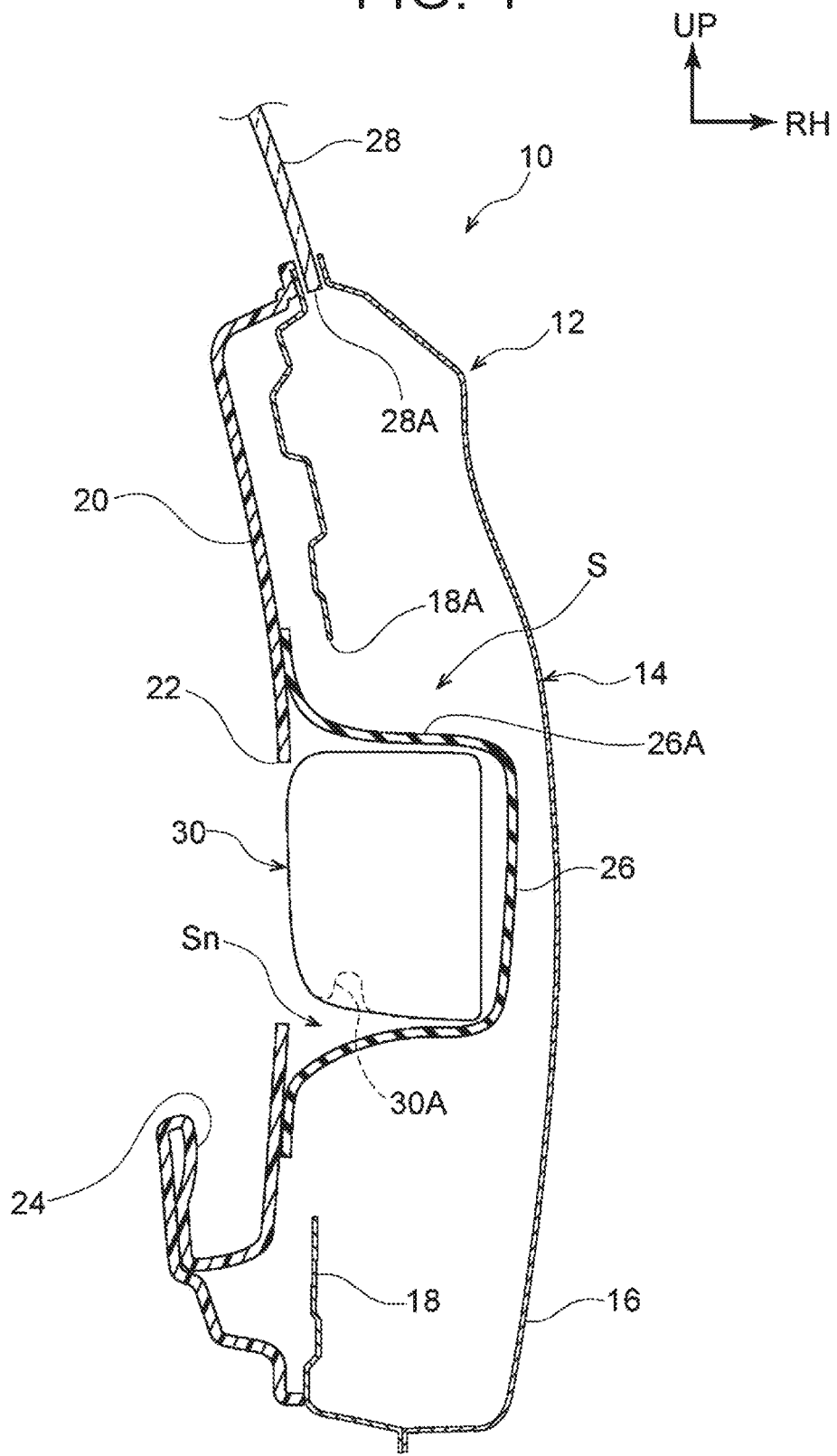
FIG. 4 is a sectional view taken along the arrow X-X in FIG. 2 when the arm rest according to the present embodiment is placed at a stored position.

Further, as an example, the following description deals with a front side door (hereinafter just referred to as a "side door") 12 configured to open and close a doorway through which an occupant gets on a front seat of the vehicle 10. Further, directions in the side door 12 are based on a state where the side door 12 closes the doorway. Accordingly, upper and lower sides, front and rear sides, and right and left sides of the side door 12 are the same as the upper and lower sides, the front and rear sides, and the right and left sides of the vehicle 10. Further, a thickness direction of the side door 12 is the same direction as a direction along the right-left direction (the vehicle width direction) of the vehicle 10. However, in a longitudinal sectional view of the side door 12 as illustrated in FIGS. 3, 4, even in a case where the arm rest 30 moves along a moving locus that slightly curves, the movement of the arm rest 30 is assumed to be a movement in the thickness direction.

Figure 1:
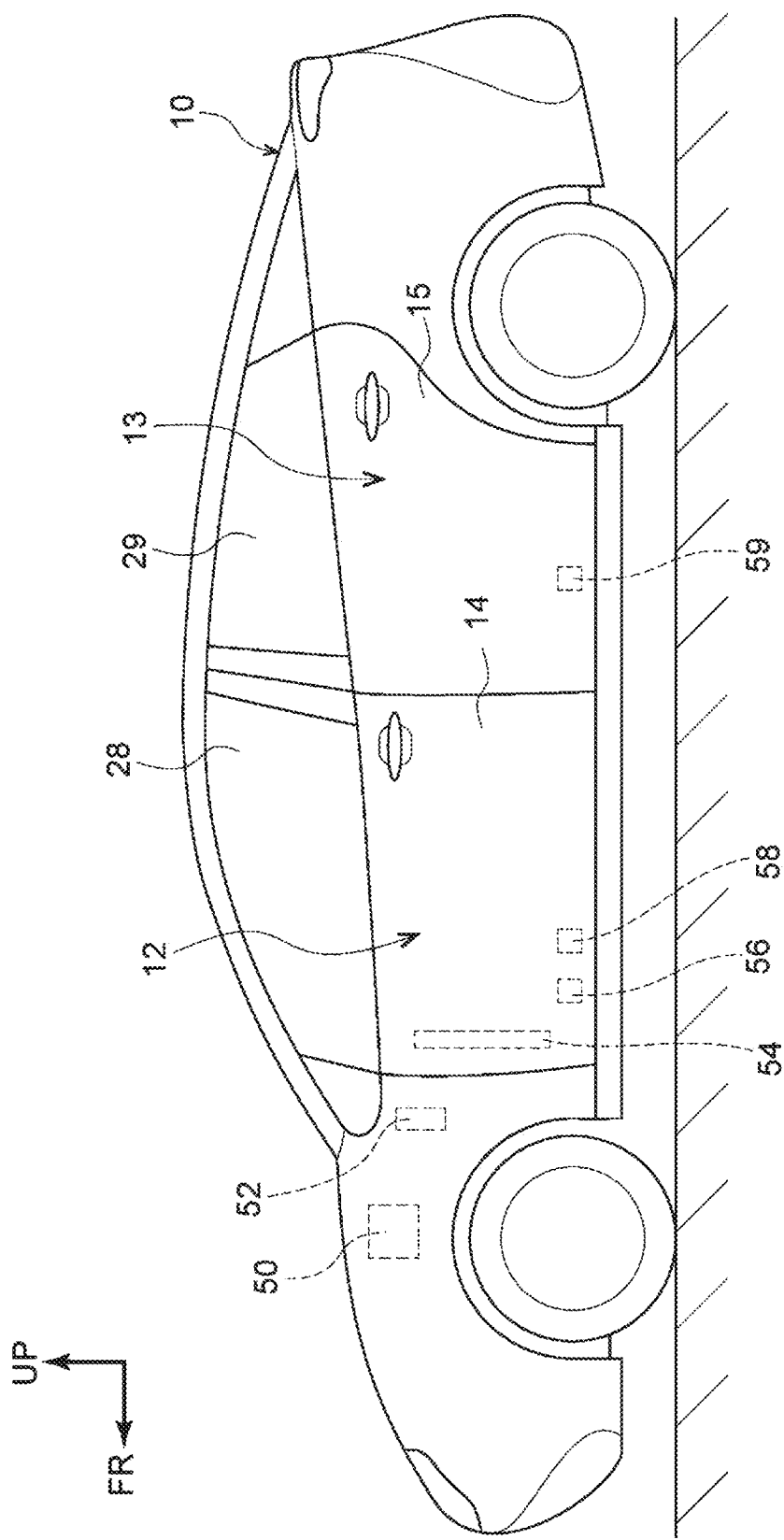
FIG. 1 is a side view illustrating a vehicle operable by self-driving according to the present embodiment.
Figure 2:
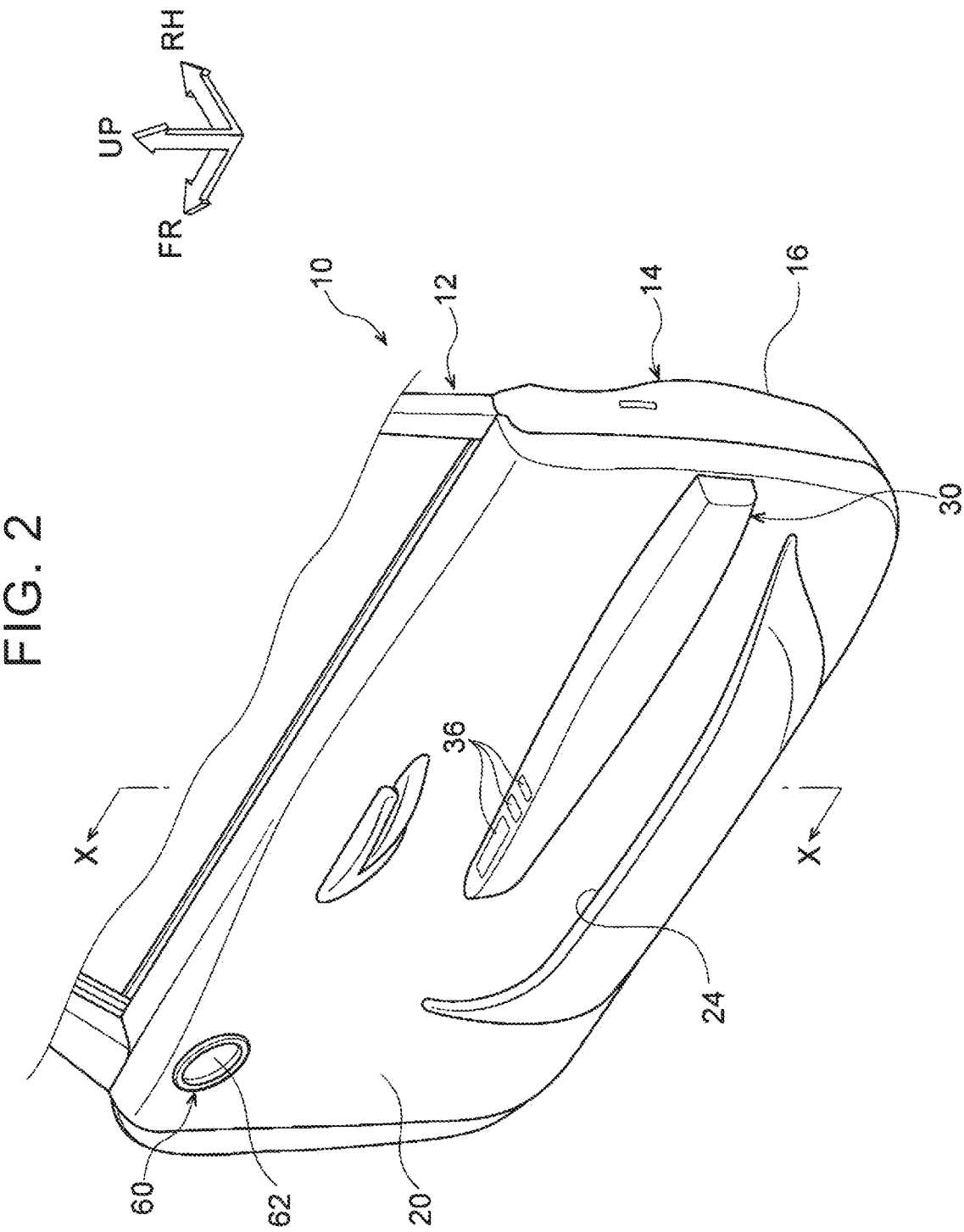
FIG. 2 is a perspective view illustrating a side door including an arm rest according to the present embodiment.

As illustrated in FIGS. 1, 2, the side door 12 is provided in the vehicle 10. Note that the side door 12 illustrated in FIG. 2 is a right side door, but side doors 12 having the same configuration are provided on the right and left sides in a symmetric manner. As illustrated in FIGS. 2 to 4, the side door 12 includes a door body portion 14. The door body portion 14 includes a door outer panel 16 placed on the outer side of the door body portion 14 in the vehicle width direction and constituting a door outer plate, and a door inner panel 18 placed inwardly in the vehicle width direction from the door outer panel 16 (on a vehicle cabin side) and constituting a door inner plate.

That is, the door body portion 14 is configured such that respective front end parts, respective rear end parts, and respective lower end parts of the door outer panel 16 and the door inner panel 18 are connected to each other by hemming (the end of the door inner panel 18 is sandwiched by the end of the door outer panel 16). Hereby, a space S having a predetermined gap is formed in the up-down direction, in the front-rear direction, and in the vehicle width direction between the door outer panel 16 and the door inner panel 18 (inside the door body portion 14).

In the space S formed inside the door body portion 14 (the side door 12), an impact beam (not illustrated) is placed, and door glass 28 is provided to be raised and lowered. Further, as illustrated in FIG. 1, inside the door body portion 14, a detecting portion 54 configured to detect a raised-lowered state of the door glass 28 (e.g., a position of a bottom end face 28A of the door glass 28, or the like), and a glass controlling portion 58 configured to control raising and lowering of the door glass 28 are provided.

As illustrated in FIGS. 3, 4, the door outer panel 16 is curved such that its central part projects outwardly in the vehicle width direction in a longitudinal sectional view along the vehicle width direction. A door trim 20 made of resin and constituting a design surface of a vehicle cabin is attached to the inner side of the door inner panel 18 in the vehicle width direction. Note that the door inner panel 18 has an opening 18A communicating with an opening 22 (described later) of the door trim 20 and allowing the arm rest 30 to move in the thickness direction of the door body portion 14 (the side door 12).

The door trim 20 is formed in a generally flat-plate shape that can cover the door inner panel 18 from the vehicle cabin side. The door trim 20 has the opening 22 that allows the arm rest 30 to move in the thickness direction of the door body portion 14 (the side door 12). The opening 22 has a shape smaller than the opening 18A of the door inner panel 18 and communicates with the opening 18A such that the arm rest 30 can pass through the opening 22.

As illustrated in FIG. 2, the arm rest 30 is formed in a block shape the longitudinal direction of which is along the front-rear direction. A switch group 36 configured to raise and lower the door glass 28 is provided in the front side of a top face of the arm rest 30. An occupant can put his or her elbow or the like on the top face (except the front side) of the arm rest 30. Further, a door pocket 24 (also see FIGS. 3, 4) in which a plastic bottle and so on can be stored is formed integrally with a part of the door trim 20 below the arm rest 30.

Figure 5:
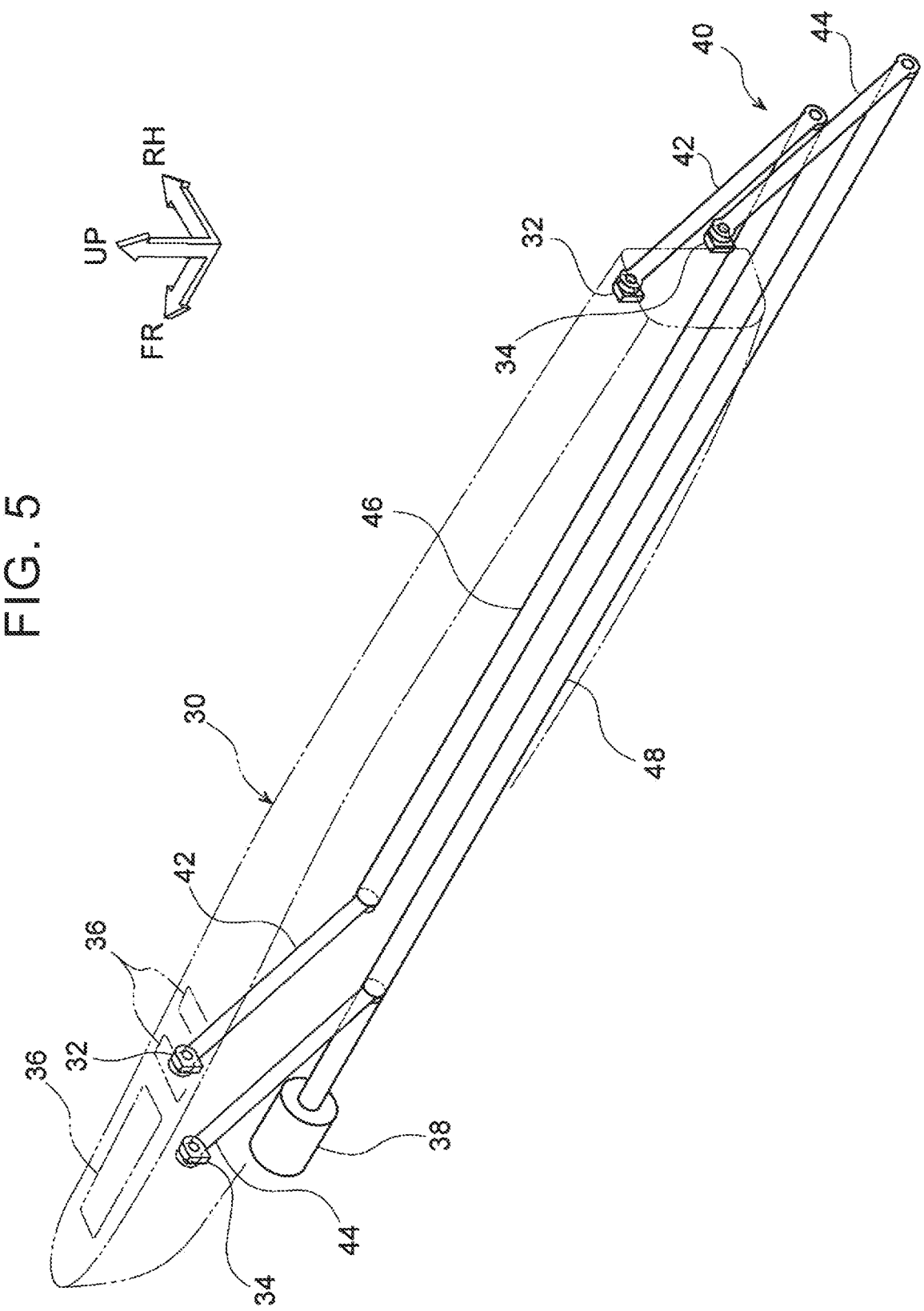
FIG. 5 is a perspective view illustrating a parallel link mechanism of the arm rest according to the present embodiment.
Figure 6:
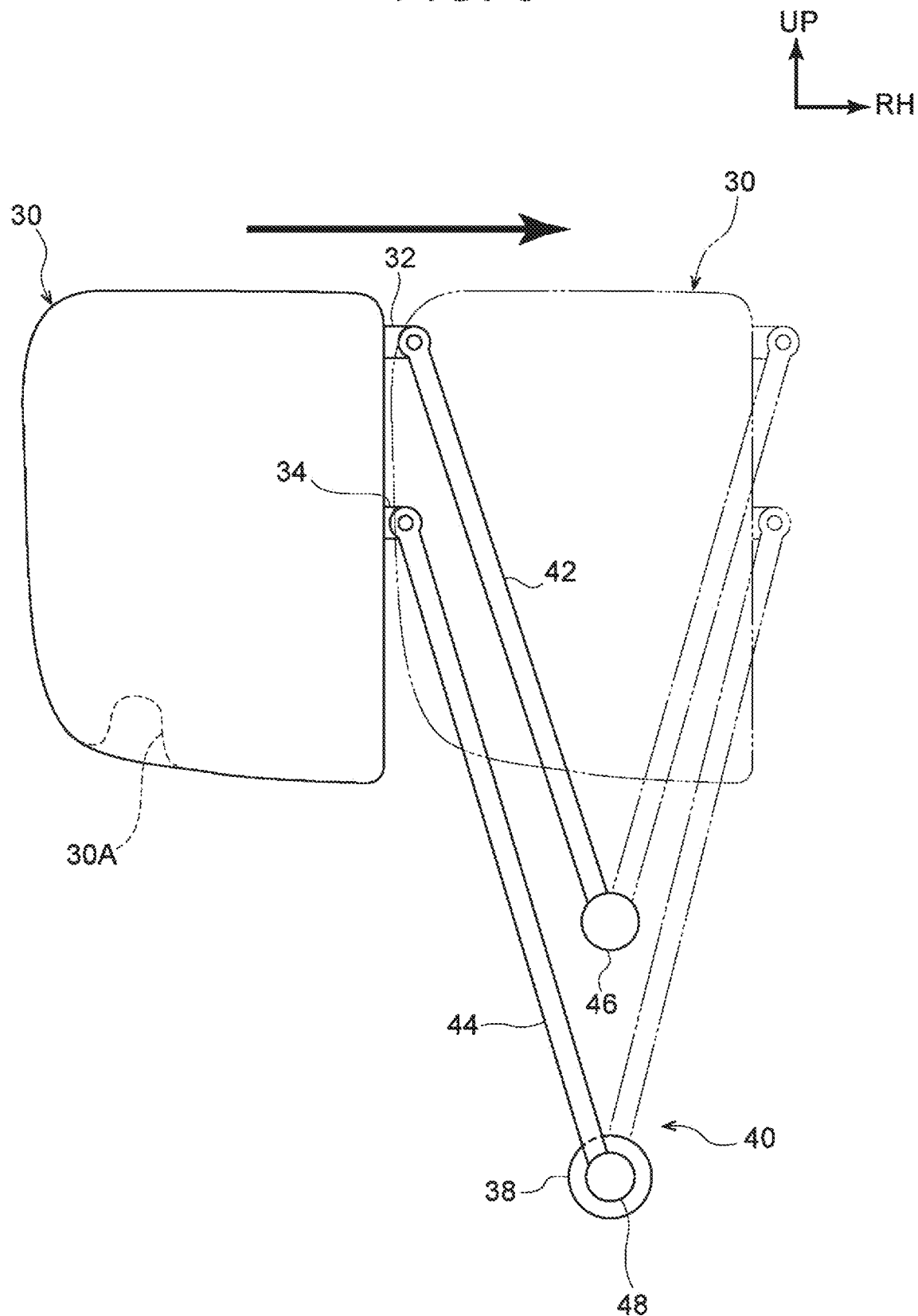
FIG. 6 is a sectional view corresponding to FIGS. 3, 4 and illustrates the parallel link mechanism of the arm rest according to the present embodiment.

As illustrated in FIGS. 5, 6, the arm rest 30 is configured to be movable in the thickness direction of the side door 12 (the door body portion 14) by a parallel link mechanism 40 as a moving mechanism. The parallel link mechanism 40 includes a pair of front and rear first link rods 42 and a pair of front and rear second link rods 44. The first link rods 42 are provided such that their respective upper end parts are pivotally connected to respective brackets 32 provided integrally with upper parts of the opposite end parts of the arm rest 30 in the longitudinal direction. The brackets 32 are provided to project outwardly in the vehicle width direction. The second link rods 44 are provided such that their respective upper end parts are pivotally connected to respective brackets 34 provided integrally with generally central parts, in the height direction, of the opposite end parts of the arm rest 30 in the longitudinal direction. The brackets 34 are provided to project outwardly in the vehicle width direction.

The parallel link mechanism 40 includes a first rotating shaft 46 and a second rotating shaft 48. Respective lower end parts of the first link rods 42 are fixed to the first rotating shaft 46, and the first rotating shaft 46 is supported by brackets (not illustrated) provided in the door inner panel 18 such that the first rotating shaft 46 is rotatable around the front-rear direction as an axial direction. Respective lower end parts of the second link rods 44 are fixed to the second rotating shaft 48, and the second rotating shaft 48 is supported by brackets (not illustrated) provided in the door inner panel 18 such that the second rotating shaft 48 is rotatable around the front-rear direction as an axial direction. Further, an electric motor 38 is coaxially attached to a first axial end of the second rotating shaft 48.

The parallel link mechanism 40 is operated by rotating the second rotating shaft 48 by the electric motor 38. That is, when the second rotating shaft 48 is rotated in both forward and reverse directions, the first link rods 42 and the second link rods 44 are rotated in the right-left direction with the first rotating shaft 46 and the second rotating shaft 48 being taken as rotation fulcrums.

Hereby, the arm rest 30 can take a usage position (see FIG. 3) and a stored position (see FIG. 4). The usage position is a position at which the arm rest 30 projects from the opening 22 to the vehicle cabin side such that an occupant sitting on a vehicle seat (not illustrated) placed adjacent to the vehicle cabin side of the side door 12 can operate (use) the switch group 36. The stored position is a position at which the arm rest 30 is stored in a storage portion Sn formed inside the door body portion 14 (in the space S). Note that, when the arm rest 30 is stored in the storage portion Sn, it is preferable that a wall surface, of the arm rest 30, that faces the vehicle cabin side do not project from the opening 22 to the vehicle cabin side. However, the wall surface of the arm rest 30 may project slightly.

Further, as illustrated in FIGS. 3, 4, a sealing member 26 having a flat-plate shape and configured to close the opening 22 from the space S side is provided inside the door body portion 14. The sealing member 26 is made of flexible rubber and is elastically deformable to such an extent that the movement of the arm rest 30 to the stored position is not disturbed. Further, the sealing member 26 is formed in a shape at least one size larger than the opening 22 so that the sealing member 26 can close the opening 22.

A peripheral edge portion of the sealing member 26 is joined and fixed to a wall surface of the door trim 20 on the space S side. Note that a central portion, of the sealing member 26, that covers the opening 22 is configured to be placed closer to the door trim 20 side than the door glass 28 in a general (restored) state so that the sealing member 26 does not bother raising and lowering of the door glass 28 when the arm rest 30 is placed at the usage position (see FIG. 3).

The sealing member 26 configured as such prevents rainwater or the like entering through a gap between the door glass 28 and an upper end part of the door body portion 14, for example, from leaking to the vehicle cabin side through the opening 18A of the door inner panel 18 and the opening 22 of the door trim 20. When the arm rest 30 is stored in the storage portion Sn, the sealing member 26 elastically deforms to allow the movement of the arm rest 30 into the storage portion Sn (see FIG. 4).

Further, as illustrated in FIG. 1, the vehicle 10 includes a travel controlling portion 50 configured to switch between a manual operation mode and a self-driving mode, and an air-conditioning controlling portion 52 configured to control a vehicle air-conditioning device (not illustrated). Inside the door body portion 14 of the side door 12, a movement controlling portion 56 configured to control driving of the electric motor 38 that operates the parallel link mechanism 40 is provided.

When the travel controlling portion 50 switches the manual operation mode to the self-driving mode, the movement controlling portion 56 controls driving of the electric motor 38 that operates the parallel link mechanism 40 so that the arm rest 30 moves from the usage position to the stored position in conjunction with the switching.

Further, in a case where the detecting portion 54 detects the bottom end face 28A of the door glass 28 being lowered to or below a predetermined position when the travel controlling portion 50 switches the manual operation mode to the self-driving mode, the glass controlling portion 58 raises the bottom end face 28A of the door glass 28 to or above the predetermined position. Note that the "predetermined position" as used herein indicates a height position at which a top face 26A of the sealing member 26 is placed when the arm rest 30 is stored in the storage portion Sn, the top face 26A facing the top face of the arm rest 30 in the up-down direction (see FIG. 4).

Further, at this time, the door glass 28 may not be raised, and the movement controlling portion 56 may control driving of the electric motor 38 that operates the parallel link mechanism 40, such that the arm rest 30 is not moved from the usage position to the stored position. That is, the movement controlling portion 56 may prohibit the movement of the arm rest 30 to the stored position (storing of the arm rest 30 into the storage portion Sn).

Note that, in this case, it is preferable that a notification unit 60 (see FIG. 2) notify the occupant that the movement of the arm rest 30 to the stored position is prohibited. The notification unit 60 may notify the occupant by causing an alarm to go off, turning on an alarm light, vibrating the vehicle seat, or other means. The notification unit 60 in the present embodiment includes a speaker 62 (see FIG. 2) provided in the side door 12, for example, so that the alarm can go off from the speaker 62.

Further, in a case where the detecting portion 54 detects the door glass 28 being raised to its upper limit when the movement controlling portion 56 controls the parallel link mechanism 40 such that the arm rest 30 is moved to the stored position, the air-conditioning controlling portion 52 is configured to automatically change the vehicle air-conditioning device to an external-air introduction mode. Hereby, the vehicle cabin of the vehicle 10 during self-driving is automatically ventilated.

Further, in such a vehicle 10 operable by self-driving, an arm rest (not illustrated) provided in a rear side door 13 (see FIG. 1) configured to open and close a doorway through which an occupant gets on a rear seat may be configured to be immovable. As illustrated in FIG. 1, inside a door body portion 15 in the rear side door 13, a subsidiary glass controlling portion 59 configured to control raising and lowering of door glass 29 is provided.

Accordingly, in a case where the detecting portion 54 detects the door glass 28 being raised to its upper limit when the movement controlling portion 56 controls the parallel link mechanism 40 such that the arm rest 30 is moved to the stored position, the subsidiary glass controlling portion 59 may be configured to automatically lower the door glass 29 of the rear side door 13. Hereby, the vehicle cabin of the vehicle 10 during self-driving is automatically ventilated.

Next will be described the operation of the vehicle 10 according to the present embodiment configured as described above.

As illustrated in FIGS. 2, 3, in manual driving of the vehicle 10, the arm rest 30 of the side door 12 is placed at the usage position. That is, the arm rest 30 projects from the opening 22 of the door trim 20 to the vehicle cabin side by the parallel link mechanism 40. Accordingly, an occupant sitting on a vehicle seat adjacent to the side door 12 can operate (use) the switch group 36 provided in the front side of the top face of the arm rest 30 or can put his or her elbow or the like on the top face (except the front side) of the arm rest 30.

In the meantime, in self-driving of the vehicle 10, the occupant sitting on the vehicle seat hardly has an opportunity to operate the switch group 36 provided in the arm rest 30. On this account, in self-driving of the vehicle 10, the arm rest 30 that becomes unnecessary can be moved to the stored position of the side door 12 (stored in the storage portion Sn formed in the door body portion 14).

That is, when the travel controlling portion 50 switches the manual operation mode to the self-driving mode in a state where the detecting portion 54 detects the bottom end face 28A of the door glass 28 being raised to or above the predetermined position, the movement controlling portion 56 controls the parallel link mechanism 40 in conjunction with the switching such that the arm rest 30 is moved from the usage position to the stored position.

Hereby, the vehicle cabin space around the occupant sitting on the vehicle seat adjacent to the side door 12 can be increased, thereby making it possible to improve a degree of freedom of movement of the feet and legs of the occupant. That is, even when the occupant is to change the posture on the vehicle seat, it is possible to prevent a knee or the like of the occupant, for example, from hitting the arm rest 30. This makes it possible to improve comfortability for the occupant.

Besides, even when the occupant sitting on the vehicle seat does not perform any additional operation, the arm rest 30 is automatically stored in the storage portion Sn in conjunction with the switching from the manual operation mode to the self-driving mode. This consequently makes it possible to further improve comfortability for the occupant. Further, this allows the occupant to easily access the door pocket 24, thereby making it possible to extremely easily take out a plastic bottle or the like stored in the door pocket 24, for example.

Further, in a case where the detecting portion 54 detects the bottom end face 28A of the door glass 28 being lowered to or below the predetermined position when the travel controlling portion 50 switches the manual operation mode to the self-driving mode, the glass controlling portion 58 raises the bottom end face 28A of the door glass 28 to or above the predetermined position. Accordingly, even when the occupant sitting on the vehicle seat does not perform any additional operation, it is possible to prevent occurrence of an inconvenience to be caused when the arm rest 30 moving to the stored position hits the door glass 28.

Further, in a case where the detecting portion 54 detects the bottom end face 28A of the door glass 28 being lowered to or below the predetermined position when the travel controlling portion 50 switches the manual operation mode to the self-driving mode, the movement controlling portion 56 may control the parallel link mechanism 40 such that the movement of the arm rest 30 from the usage position to the stored position is prohibited. In this case, even when the occupant sitting on the vehicle seat does not perform any additional operation, it is also possible to prevent occurrence of an inconvenience to be caused when the arm rest 30 moving to the stored position hits the door glass 28.

Note that, in this case, the notification unit 60 notifies the occupant that the movement of the arm rest 30 from the usage position to the stored position is prohibited. That is, the occupant can recognize the reason why the arm rest 30 cannot be stored. Accordingly, the occupant can take appropriate measures necessary to store the arm rest 30 in the storage portion Sn, for example, such that the occupant raises the door glass 28 by operating the switch group 36.

Further, in a case where the detecting portion 54 detects the door glass 28 being raised to its upper limit when the movement controlling portion 56 controls the parallel link mechanism 40 such that the arm rest 30 is moved to the stored position, the air-conditioning controlling portion 52 switches the vehicle air-conditioning device to the external-air introduction mode. Accordingly, in self-driving of the vehicle 10, it is possible to automatically restrain poor ventilation inside the vehicle cabin, thereby making it possible to improve comfortability for the occupant.

Note that, in a case where the detecting portion 54 detects the door glass 28 being raised to its upper limit when the movement controlling portion 56 controls the parallel link mechanism 40 such that the arm rest 30 is moved to the stored position, the subsidiary glass controlling portion 59 may lower the door glass 29 of the rear side door 13 including the immovable arm rest. Even in this case, in self-driving of the vehicle 10, it is possible to automatically restrain poor ventilation inside the vehicle cabin, thereby making it possible to improve comfortability for the occupant.

Further, the arm rest 30 may be configured to be manually moved from the usage position to the stored position without providing the electric motor 38. That is, when the arm rest 30 is moved from the usage position to the stored position, the arm rest 30 may be stored in the storage portion Sn such that the occupant presses the arm rest 30 outwardly in the vehicle width direction.

When the arm rest 30 is moved from the stored position to the usage position, the arm rest 30 should be drawn out from the storage portion Sn such that the occupant grips the arm rest 30 by hand. Accordingly, in this case, in order to easily draw the arm rest 30 manually, it is preferable that a recessed portion 30A (see FIGS. 3, 4, 6) having a size that allows the hand to be inserted into the recessed portion 30A be formed on a lower face of the arm rest 30.

Further, as described above, the sealing member 26 that can close the opening 22 from the space S side is provided inside the door body portion 14 of the side door 12. Accordingly, even when rainwater or the like enters through a gap between the door glass 28 and the upper end part of the door body portion 14, for example, it is possible to prevent the rainwater or the like from leaking to the vehicle cabin side through the opening 18A of the door inner panel 18 and the opening 22 of the door trim 20.

The vehicle 10 according to the present embodiment has been described with reference to the drawings. However, the vehicle 10 according to the present embodiment is not limited to those illustrated herein, and its design is modifiable appropriately within a range that does not deviate from the gist of the present disclosure. For example, the arm rest 30 according to the present embodiment is also applicable to a side door (not illustrated) of a vehicle (not illustrated) that is operated only manually.

Further, the arm rest 30 is not limited to the configuration in which the arm rest 30 is provided in the side door 12. For example, the arm rest 30 may be provided movably on an arm rest base (not illustrated) provided on a floor panel (not illustrated) between the vehicle seat and the side door 12 such that the arm rest 30 takes the usage position and the stored position. Note that, even in a case where the arm rest 30 is provided in the side door 12, it may be said that the arm rest 30 is placed between the vehicle seat and the side door 12.

Further, in a case where the detecting portion 54 detects the door glass 28 being raised to its upper limit and no occupant sits on a vehicle seat on a passenger side when the movement controlling portion 56 controls the parallel link mechanism 40 such that the arm rest 30 is moved to the stored position, the glass controlling portion 58 provided in the side door 12 may be configured to automatically lower the door glass 28 of the side door 12 adjacent to the vehicle seat on the passenger side so as to ventilate the vehicle cabin.

Further, the movement controlling portion 56 is not limited to the configuration in which, when the travel controlling portion 50 switches the manual operation mode to the self-driving mode, the movement controlling portion 56 controls the parallel link mechanism 40 in conjunction with the switching such that the arm rest 30 is moved from the usage position to the stored position. For example, a detection unit (not illustrated) configured to detect a rearward tilting angle of a seatback may be provided in the vehicle seat, and when the detecting unit detects the rearward tilting angle of the seatback being equal to or more than a predetermined angle, the movement controlling portion 56 may control the parallel link mechanism 40 in conjunction with the detection by the detecting unit such that the arm rest 30 is moved from the usage position to the stored position.

What is claimed is:

1. A vehicle, comprising:
an arm rest placed between a vehicle seat and a side door;
a moving mechanism configured to move the arm rest in a thickness direction of the side door such that the arm rest takes a usage position and a stored position, the usage position being a position at which the arm rest is usable for an occupant sitting on the vehicle seat, the stored position being a position at which the arm rest is stored in a storage portion provided in the side door;
a travel controlling portion configured to switch between a manual operation mode and a self-driving mode; and
a movement controlling portion configured to control the moving mechanism,
wherein, when the travel controlling portion switches the manual operation mode to the self-driving mode, the movement controlling portion controls the moving mechanism such that the arm rest is moved from the usage position to the stored position.

2. The vehicle according to claim 1, further comprising:
door glass provided in the side door such that the door glass is raised and lowered;
a detecting portion configured to detect a raised-lowered state of the door glass; and
a glass controlling portion configured to control raising and lowering of the door glass,
wherein, in a case where the detecting portion detects the door glass being lowered to or below a predetermined position when the travel controlling portion switches the manual operation mode to the self-driving mode, the glass controlling portion raises the door glass to or above the predetermined position.

3. The vehicle according to claim 1, further comprising:
door glass provided in the side door such that the door glass is raised and lowered; and
a detecting portion configured to detect a raised-lowered state of the door glass, wherein, in a case where the detecting portion detects the door glass being lowered to or below a predetermined position when the travel controlling portion switches the manual operation mode to the self-driving mode, the movement controlling portion controls the moving mechanism such that the arm rest is not moved from the usage position to the stored position.

4. The vehicle according to claim 3, further comprising a notification unit configured to notify the occupant that the movement controlling portion controls the moving mechanism such that the arm rest is not moved from the usage position to the stored position.

5. The vehicle according to claim 2, further comprising an air-conditioning controlling portion configured to control a vehicle air-conditioning device,
wherein, in a case where the detecting portion detects the door glass being raised to an upper limit of the door glass when the movement controlling portion controls the moving mechanism such that the arm rest is moved to the stored position, the air-conditioning controlling portion switches the vehicle air-conditioning device to an external-air introduction mode.

6. The vehicle according to claim 2, further comprising a subsidiary glass controlling portion configured to control raising and lowering of door glass of a side door including an immovable arm rest,
wherein, in a case where the detecting portion detects the door glass being raised to an upper limit of the door glass when the movement controlling portion controls the moving mechanism such that the arm rest is moved to the stored position, the subsidiary glass controlling portion lowers the door glass of the side door including the immovable arm rest.

* * * * *